Aug. 27, 1968 H. R. STODDARD 3,399,270
TERMINAL FOR CABLE COMPRISING A PLURALITY OF SHEATHED CONDUCTORS
Filed March 14, 1966 2 Sheets-Sheet 2
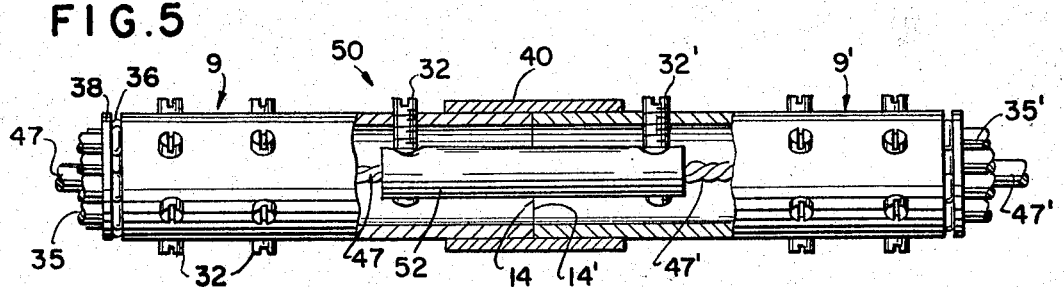
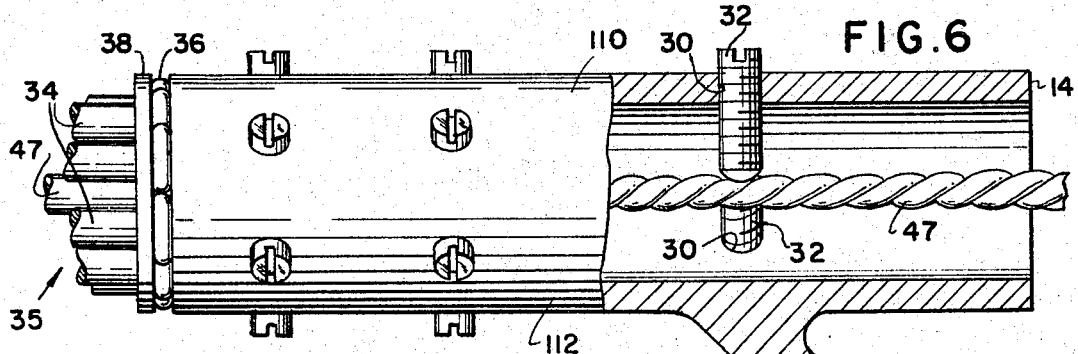
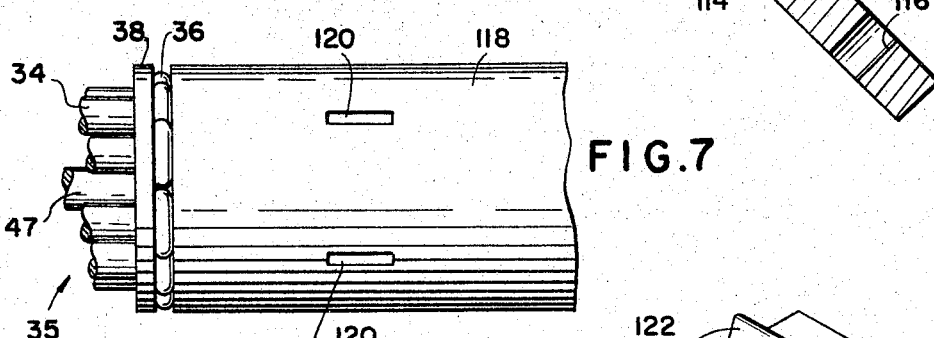
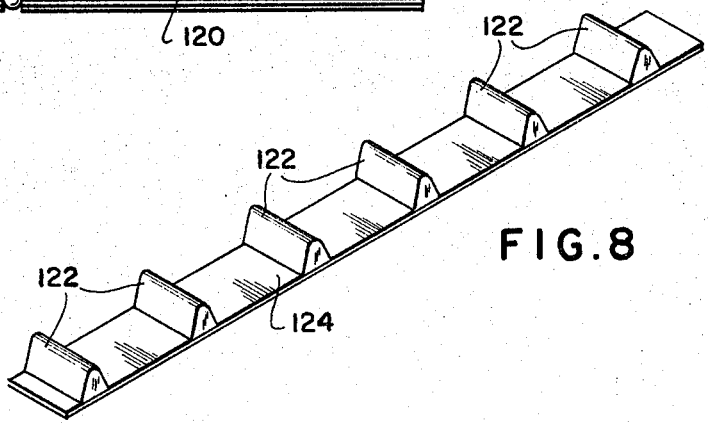
INVENTOR.
HENRY R. STODDARD
BY *Mclean Morton and Boustead*
ATTORNEYS

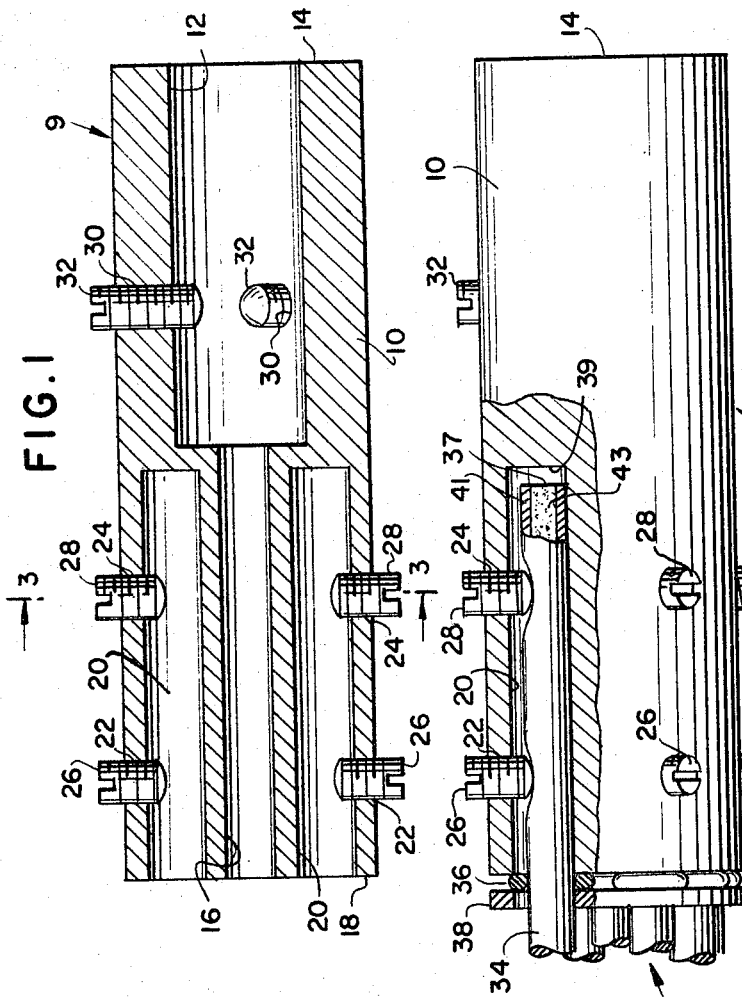

United States Patent Office 3,399,270
Patented Aug. 27, 1968

3,399,270
TERMINAL FOR CABLE COMPRISING A PLURALITY OF SHEATHED CONDUCTORS
Henry R. Stoddard, Needham, Mass., assignor to Simplex Wire and Cable Company, Cambridge, Mass., a corporation of Massachusetts
Filed Mar. 14, 1966, Ser. No. 534,132
6 Claims. (Cl. 174—90)

ABSTRACT OF THE DISCLOSURE

A terminal is disclosed for a cable which includes a plurality of sheathed conductors having as a conductive metal an alkali metal, an alkaline earth metal or an alloy thereof. The terminal includes a cylindrical electrically conductive body member having a series of axially aligned sockets. Each socket is adapted to receive one of the individual sheathed conductors. Means are provided which establish mechanical connection between each socket and the sheath of an internally located individual conductor, and each socket is then sealed to prevent passage of moisture or air between the socket and the conductor sheath. The terminal may be used as a dead end, as a means for connecting to a more conventional conductor or a pair of such terminals can be connected in back to back relationship and coupled together to act as a splice.

Specification

The present invention relates to conductor terminals and in particular to a terminal suitable for use with stranded cables having individual conductors made of alkali metals, alkaline earth metals and alloys and mixtures thereof.

Conductors made of alkali metals, alkaline earth metals, their alloys and mixtures present termination problems not previously encountered and, therefore, terminals and joining techniques heretofore generally known are not suitable for use with these conductors. Because of the high reactivity of the metals involved, conductors made of them must be protected from the atmosphere, as by enclosure in a tubular sheath in the case of elongated conductors, and the conductor terminal must be adapted to aid in this protection. The low tensile strength of these conductor metals, moreover, reduces their ability to form an effective mechanical bond with the terminal and alternate bonding methods must be resorted to.

It is, therefore, an object of the present invention to provide a terminal for cables made up of a plurality of sheathed conductors wherein the conductive metal is an alkali metal, alkaline earth metal, or an alloy or mixture thereof, which terminal incorporates a sealing arrangement whereby the reactive metal of each conductor is protected from the atmosphere and which terminal is affixed mechanically to the conductor sheaths.

The cables to which the present invention is particularly adapted are those having a plurality of individual conductors wrapped around a central high tensile messenger. Aerial cables of this type have been used with individual copper conductors wrapped around a steel messenger and are known as ACSR cables. A similar construction is proposed for use in aerial cables made from metals such as sodium wherein the individual strands are sodium filled aluminum tubes. The terminal of the present invention is particularly adapted for use with these cables and others like it.

The terminal of the present invention includes a cylindrical electrically conductive body member having a central passage through which the steel or other high tensile strength messenger is passed to be secured by a splice or other connector to a similar member of a second cable or to an anchoring structure. The splice or other connector by which the messenger is secured is conventional and its construction forms no part of the present invention.

A series of sockets are disposed radially about the central passage. Each socket is adapted to receive a conductor strand and has means associated therewith such as set screws for mechanical connection to the strand sheath. Means are provided for sealing the space between each conductor strand and the socket into which it is inserted thus preventing the entry of moisture or vapors.

For a further description of the present invention reference is made to the annexed drawings of which:

FIG. 1 is a longitudinal cross section of a terminal constructed according to the present invention;

FIG. 2 is an end view partly in section of the terminal shown in FIG. 1 attached to a stranded cable;

FIG. 3 is a sectional view taken along line 3—3 in FIG. 1;

FIG. 4 is an elevational view with parts broken away showing the connection of a stranded conductor to the terminal of FIG. 1;

FIG. 5 is an elevational view partly in section of a pair of terminals similar to that shown in FIG. 1 coupled together to form a splice;

FIG. 6 is an elevational view partly in section of a terminal similar to that shown in FIG. 1 adapted for electrical connection to more conventional conductors;

FIG. 7 is a terminal similar to that shown in FIG. 1 having an alternate means for securing the cable strands to the terminal; and FIG. 8 is a perspective view of the securing elements used in association with the terminal of FIG. 7.

Referring now to FIG. 1 a terminal 9 is shown having an electrically conductive body member 10 which is substantially cylindrical and has a central passage 12 of relatively large diameter extending from one end 14 for about half its length. A second central passage 16 extends from the other end 18 of terminal 10 and joins central passage 12. Central passage 16 is of relatively small diameter sized to closely fit about a central steel messenger of a stranded cable. Passage 12 is relatively larger than passage 16 its size being sufficiently large to permit the location therein of a steel messenger and messenger splice.

End 18 of terminal 9 includes a plurality of axially aligned sockets 20 positioned radially about central passage 16 and extending into terminal 9 a distance slightly less than the length of central passage 16. Each socket 20 is sized slightly larger than a single conductive strand of the cable for which the terminal is designed. A pair of transverse apertures 22 and 24 communicate with the interior of each socket 20 and a pair of set screws 26 and 28 threadedly pass through apertures 22 and 24 respectively. The number of sockets 20 in any given terminal 9 is equal to the number of individual conductive strands about the messenger of the cable for which the terminal is designed; as depicted in FIG. 2 there are normally six sockets 20.

Terminal 9 also includes at least one and preferably three transverse apertures 30 communicating with the interior of central passage 12 and a set screw 32 is threadedly passed through each aperture 30 to engage the steel messenger of the cable or its associated splice thereby fixing the position of terminal 9 along the axis of the cable.

In FIG. 4 the connection of a single conductor strand 34 of a stranded conductor 35 to terminal 9 is depicted. As will be seen the conductor strand 34, e.g., an aluminum tubular sheath 41 filled with a conductive metal 43, such as sodium, is passed into socket 20 until its end 37 is a short distance from the closed end 39 of socket 20. Set screws 26 and 28 are then tightened in that order to securely grip strand 34 without exerting a pressure in excess of the yield strength of sheath 41. The tightening of set screws 26 and 28 forces strand 34 against the opposite wall of socket 20 and partially collapses sheath 41 causing some extrusion of conductive metal 43 into the space between end 37 of conductor strand 34 and closed end 39 of socket 20. This extrusion of conductive metal 43 forces any vapors which may be present out of socket 20. After set screws 26 and 28 are firmly tightened an O-ring 38 having an outside diameter greater than the inside diameter of socket 20 and which has been previously positioned on strand 34 is moved along strand 34 until it is sealingly adjacent the end of socket 20. O-ring 38 is held firmly against end 18 of body 10 by a pressure plate 38. Pressure plate 38 has a cross sectional configuration identical to that of end 18 including apertures 20' in register with sockets 20 and aperture 16' in register with central passage 16. Pressure plate 38 is held in place by a series of screws 45 which pass through it into tapped borings in end 18 of body 10. As may be seen from FIG. 2 an O-ring 36 is also provided on the central steel messenger 47 to seal the space between it and passage 16 thereby preventing moisture from entering the center of terminal 9.

In FIG. 5 a splice 50 is shown consisting of a pair of terminals 9, 9' each connected to a stranded cable 35, 35' and identical in all respects to terminal 9 of FIG. 1. The same reference numerals are used in FIG. 5 as in FIGS. 1-4 a (') being used to distinguish between the two terminals. Terminals 9, 9' are arranged in back to back relationship, their ends 14, 14' abutting and held together by a coupling 40. Splice 50 is connected by first passing the steel messengers 47, 47' through the central passages of terminals 9, 9' and joining their ends with a messenger splice 52. Terminals 9, 9' are then brought into back to back relationship with each other and set screws 32, 32' are tightened against messenger splice 52 thus fixing the positions of terminals 9, 9' along the axis of steel messengers 47, 47'. Thereafter, each strand 34, 34' of stranded cables 35, 35' is secured in a corresponding socket 20, 20' as explained above.

In FIG. 6 a terminal 110 is shown suitable for connection to a more conventional conductor. Terminal 110 is substantially identical to terminal 9 of FIG. 1 and the same reference numerals are used to identify those parts common to both. Terminal 110 has a body 112 which includes an adaptor arm 114 extending outwardly at some angle to its axis in the form of a lug. Adaptor arm 114 provides for connection to terminal 110 from a more conventional conductor and an aperture 116 is provided for that purpose. The connection of stranded conductor 35 to terminal 110 can be similar to that described above with reference to FIG. 5 or, as shown in FIG. 6, high tensile messenger 47 can pass beyond end 14 of terminal 110 for connection to a structure or other anchoring device and in that case set screws 32 are tightened until they bear directly on messenger 47. Tightening of set screws 32 fixes the position of terminal 110 along the axis of messenger 47.

In FIG. 7 a terminal 118 having an alternate means for mechanical connection to the individual conductor strands 34 is shown. Terminal 118 is somewhat similar to terminal 9 of FIG. 1 and includes central passages identical to central passages 16 and 12 of FIG. 1 and axially aligned sockets identical to sockets 20 in FIG. 1. A single oval shaped transverse aperture 120 communicates with the interior of each such socket and a wedge 122 is provided to pass through each aperture 120 into its associated socket a distance sufficient to securely hold a conductor strand 34 by partially collapsing its sheath but without exceeding the yield strength of the sheath.

As shown in FIG. 8 the wedges 122 can be arranged on a single strap 124, each wedge being spaced from its adjacent wedges a proper distance that all wedges can be partially inserted into apertures 120 and compression applied about strap 124 to force the wedges into all strands 34 at the same time.

The terminals of this invention rely for electrical connection to the stranded conductor on the contact between the interior walls of sockets 20 and the conductor sheaths and also upon contact established by the partial extrusion of conductive metal from the end of each strand 34 into the limited space provided for this purpose. This electrical contact can be supplemented by contact between set screws 26 and 28 and the stranded sheaths when screws 26 and 28 are electrically conductive. Electrical connection between terminals 9 and 9' of splice 50 in FIG. 5 is established through the abutting ends 14 and 14' and can be aided by coupling 40 if the latter is made of conductive metal.

Sealing of the passages 20 of our terminals can be aided or accomplished exclusively by forcing silicone grease into the spaces between the conductor strands and the internal walls of the sockets. It is also advantageous to purge the interior spaces of all sockets 20 with an inert gas prior to connection to cable 35.

It is claimed:

1. A terminal connected to a cable which includes a plurality of sheathed conductors each having as a conductive metal an alkali metal, an alkaline earth metal or an alloy or mixture thereof, which terminal includes an electrically conductive body portion, axially aligned sockets in said body, each socket receiving one of said plurality of conductors, means establishing mechanical connection between each said socket and the sheath of an internally located individual conductor and means establishing a sealing relationship between said sockets and said individual conductors.

2. The terminal and cable according to claim 1 wherein said cable includes a tensile member received in a central passage of said body portion.

3. A terminal and cable according to claim 1 which further includes means for connecting conventional conductors thereto.

4. The terminal and cable according to claim 1 wherein the sheathed conductors have electrically conductive sheaths.

5. A splice joining a pair of cables each of which includes a plurality of sheathed conductors each having as a conductive metal an alkali metal, an alkaline earth metal or an alloy or mixture thereof which splice including a pair of terminals and cables according to claim 1 arranged in back-to-back relationship with their ends abutting and held together by a coupling.

6. The splice and cables according to claim 5 wherein said cables include tensile members which are spliced within said terminals.

References Cited
UNITED STATES PATENTS
3,047,835    7/1962    Kelly _____ 174—71 XR
3,260,983    7/1966    Daum et al. _____ 174—71 XR DARRELL L. CLAY, *Primary Examiner.*